US012289270B2

(12) United States Patent
Takeda et al.

(10) Patent No.: US 12,289,270 B2
(45) Date of Patent: Apr. 29, 2025

(54) USER TERMINAL AND RADIO COMMUNICATION METHOD

(71) Applicant: NTT DOCOMO, INC., Tokyo (JP)

(72) Inventors: Kazuki Takeda, Tokyo (JP); Satoshi Nagata, Tokyo (JP); Lihui Wang, Beijing (CN); Min Liu, Beijing (CN); Xiaolin Hou, Beijing (CN); Chongning Na, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/960,678

(22) PCT Filed: Jan. 12, 2018

(86) PCT No.: PCT/JP2018/000571
§ 371 (c)(1),
(2) Date: Jul. 8, 2020

(87) PCT Pub. No.: WO2019/138528
PCT Pub. Date: Jul. 18, 2019

(65) Prior Publication Data
US 2020/0358577 A1    Nov. 12, 2020

(51) Int. Cl.
*H04L 5/00* (2006.01)
*H04W 80/02* (2009.01)
*H04W 88/02* (2009.01)

(52) U.S. Cl.
CPC .......... *H04L 5/0053* (2013.01); *H04L 5/0023* (2013.01); *H04L 5/0042* (2013.01);
(Continued)

(58) Field of Classification Search
CPC ... H04L 5/0053; H04L 5/0023; H04L 5/0042; H04L 5/0094; H04W 88/02
See application file for complete search history.

(56) References Cited

U.S. PATENT DOCUMENTS

2017/0041923 A1* 2/2017 Park ...................... H04L 5/0053
2017/0134117 A1* 5/2017 Tan Bergström ..... H04L 1/0006
(Continued)

OTHER PUBLICATIONS

Catt, "The usage of LCID field in MAC sub-header", 3GPP TSG-RAN WG2 Meeting #NR AH2, Qingdao, China, Jun. 27-29, 2017, R2-1706363 (Year: 2017).*
(Continued)

*Primary Examiner* — Joseph A Bednash
(74) *Attorney, Agent, or Firm* — Osha Bergman Watanabe & Burton LLP

(57) ABSTRACT

The present disclosure is designed to determine appropriate spatial resources for uplink control channels. A user terminal has a receiving section that receives, through higher layer signaling, a plurality of entries of information related to a spatial resource for an uplink control channel, and receives specifying information that specifies, amongst the plurality of entries, entries that correspond respectively to the plurality of uplink control channel resources, by means of a control element of media access control, and a control section that controls determination of one of the plurality of uplink control channel resources, and controls transmission of the uplink control channel, by using an entry that corresponds to the determined uplink control channel resource, amongst the specified entries.

5 Claims, 12 Drawing Sheets

(52) U.S. Cl.
CPC ............ *H04L 5/0094* (2013.01); *H04W 80/02* (2013.01); *H04W 88/02* (2013.01)

(56) References Cited

U.S. PATENT DOCUMENTS

| | | | |
|---|---|---|---|
| 2017/0302341 | A1 | 10/2017 | Yu et al. |
| 2017/0366377 | A1 | 12/2017 | Papasakellariou |
| 2019/0342894 | A1* | 11/2019 | Yi ........................ H04L 5/0053 |
| 2020/0221444 | A1* | 7/2020 | Tiirola .................. H04L 1/1812 |
| 2021/0084640 | A1* | 3/2021 | Kang .................... H04L 5/0048 |
| 2021/0136768 | A1* | 5/2021 | Kang ........................ H04L 1/00 |

OTHER PUBLICATIONS

Huawei et al., "Beam Management for PUCCH", 3GPP TSG RAN WG1 Meetign #91, Reno, USA, Nov. 27-Dec. 1, 2017, R1-1719807 (Year: 2017).*
Huawei et al., "Need for new MAC CEs for UL and DL beam management", 3GPP TSG-RAN WG2#100, Reno, Nevada, USA, Nov. 27-Dec. 1, 2017, R2-1712561 (Year: 2017).*
Qualcomm, "Summary of Beam Mgmt.", 3GPP TSG RAN WG1 Meeting #91, Reno, USA, Nov. 27-Dec. 1, 2017, R1-1721696 (Year: 2017).*
Huawei et al., "Beam Management for Pucch", 3GPP TSG RAN WG1 Meeting #91, Reno, USA, Nov. 27-Dec. 1, 2017, R1-1719807 (Year: 2017).*
3GPP TS 36.321 V13.1.0 (Mar. 2016) 3rd Generation Partnership Project; Technical Specification Group Radio Access Network; Evolved Universal Terrestrial Radio Access (E-UTRA); Medium Access Control (MAC) protocol specification (Release 13), pp. 1-2, 55-56, 71 (Year: 2016).*
Samsung, "NR MAC header fields", 3GPP TSG-RAN WG2 Meeting #98 Hangzhou, China, May 15-19, 2017 (Year: 2017).*
Report of 3GPP YSG RAN2#98 meeting, Hangzhou, China, ETSI MCC, 3GPP TSG-RAB meeting #99, Berlin, Germany, Aug. 21-25, 2017, R2-1707601, pp. 184-185 (Year: 2017).*
Ericsson, "On beam indication, measurement, and reporting", 3GPP TSG-RAN WG1 #90bis, Prague, Czech Republic, Oct. 9-13, 2017, R1-1718433 (Year: 2017).*
Huawei et al. "Need for new MAC CEs for UL and DL beam management", 3GPP TSG-RAN WG2 WG2#100, Reno, Nevada, USA, Nov. 27-Dec. 1, 2017, R2-1712561 (Year: 2017).*
International Search Report issued in PCT/JP2018/000571 mailed on Mar. 6, 2018 (1 page).
Written Opinion of the International Searching Authority issued in PCT/JP2018/000571 mailed on Mar. 6, 2018 (3 pages).
Huawei, HiSilicon; "Beam management for PUCCH"; 3GPP TSG RAN WG1 Meeting #91, R1-1719807; Reno, USA; Nov. 27-Dec. 1, 2017 (6 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
Extended European Search Report in counterpart European Application No. 18 89 9368.7 issued Aug. 6, 2021 (8 pages).
H. Huawei; "Beam management for PUCCH"; 3GPP TSG RAN WG1 Meeting #91, R1-1719807; Reno, USA; Nov. 27-Dec. 1, 2017 (6 pages).
Qualcomm; "Summary of Beam Mgmt."; 3GPP TSG RAN WG1 Meeting #91, R1-1721696; Reno, USA; Nov. 27-Dec. 1, 2017 (14 pages).
Office Action issued in the counterpart Japanese Patent Application No. 2019-564232, mailed on Feb. 8, 2022 (6 pages).
CATT; "The usage of LCID field in MAC sub-header"; 3GPP TSG-RAN WG2 Meeting #NR AH2, R2-1706363; Qingdao, China; Jun. 27-29, 2017 (3 pages).
Vivo; "Remaining details on beam measurement and reporting"; 3GPP TSG RAN WG1 Meeting #91, R1-1719769; Reno, USA; Nov. 27-Dec. 1, 2017 (8 pages).
Office Action issued in Australian Application No. 2018402429 mailed on Jul. 28, 2022 (4 pages).
Office Action issued in European Application No. 18899368.7 mailed on Mar. 30, 2023 (8 pages).
Excerpt from 3GPP TS 38.321 V15.13.0 (Release 15) Mar. 2022 (1 page).
Office Action issued in Chinese Application No. 201880090761.7; Dated Sep. 28, 2023 (15 pages).
Office Action issued in Brazilian Application No. 112020014069-4; Dated Dec. 3, 2024 (5 pages).

* cited by examiner

USER TERMINAL AND RADIO COMMUNICATION METHOD

TECHNICAL FIELD

The present disclosure relates to a user terminal and a radio communication method in next-generation mobile communication systems.

BACKGROUND ART

In the UMTS (Universal Mobile Telecommunications System) network, the specifications of long-term evolution (LTE) have been drafted for the purpose of further increasing high speed data rates, providing lower latency and so on (see non-patent literature 1). In addition, for the purpose of achieving further broadbandization and increased speed beyond LTE, successor systems of LTE (referred to as, for example, "LTE-A (LTE-Advanced)," "FRA (Future Radio Access)," "4G," "5G," "5G+(plus)," "NR (New RAT)," "LTE Rel. 14," "LTE Rel. 15 (or later versions)," and so on) are also under study.

In existing LTE systems (for example, LTE Rel. 8 to 13), downlink (DL) and/or uplink (UL) communication are carried out using 1-ms subframes (also referred to as "transmission time intervals (TTIs)" and so on). These subframes are the time unit for transmitting one channel-encoded data packet, and serve as the unit of processing in, for example, scheduling, link adaptation, retransmission control (HARQ (Hybrid Automatic Repeat reQuest)) and so on.

Also, in existing LTE systems (for example, LTE Rel. 8 to 13), a user terminal transmits uplink control information (UCI) by using an uplink control channel (for example, a PUCCH (Physical Uplink Control CHannel)) or an uplink data channel (for example, a PUSCH (Physical Uplink Shared CHannel)). The format of this uplink control channel is referred to as "PUCCH format (PF (PUCCH Format))" and/or the like.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall Description; Stage 2 (Release 8)," April, 2010

SUMMARY OF INVENTION

Technical Problem

Envisaging future radio communication systems (for example, LTE Rel. 14 or later versions, NR, 5G, etc.), research is underway to carry out communication by using beamforming (BF).

A user terminal determines spatial resources (for example, beams) and uplink control channel resources, and transmits uplink control channels by using these resources. However, unless uplink control channels are transmitted using appropriate spatial resources, a decline in the quality of communication or other problems might arise.

It is therefore an object of the present disclosure to provide a user terminal and a radio communication method, whereby spatial resources that are appropriate for uplink control channels can be determined.

Solution to Problem

One aspect of the present disclosure provides a user terminal having a receiving section that receives, through higher layer signaling, a plurality of entries of information related to a spatial resource for an uplink control channel, and receives specifying information that specifies, amongst the plurality of entries, entries that correspond respectively to the plurality of uplink control channel resources, by means of a control element of media access control, and a control section that controls determination of one of the plurality of uplink control channel resources, and controls transmission of the uplink control channel, by using an entry that corresponds to the determined uplink control channel resource, amongst the specified entries.

Advantageous Effects of Invention

According to one aspect of the present disclosure, spatial resources that are appropriate for uplink control channels can be determined.

DESCRIPTION OF EMBODIMENTS

Future radio communication systems (for example, LTE Rel. 14 or later versions, NR or 5G, etc.) are under study to carry out communication by using beamforming (BF).

For example, beams that are used by a user terminal and/or a radio base station (for example, a gNB (gNodeB)) may include beams for use for transmitting signals (also referred to as "transmitting beams," "Tx beams," etc.), beams for use for receiving signals (also referred to as "receiving beams," "Rx beams," etc.) and so forth. A pair of a transmitting beam of the transmitting end and a receiving beam of the receiving end may be referred to as a "beam pair link (BPL)."

The user terminal and/or the radio base station may determine beams by measuring a reference RS. This reference RS (Reference Signal) may be at least one of a synchronization signal block (SSB), a channel state measurement RS (CSI-RS (Channel State Information RS)) and a sounding RS (SRS (Sounding Reference Signal)). Note that an SSB may be referred to as an "SS/PBCH (Physical Broadcast CHannel) block" and the like.

Figure 1:
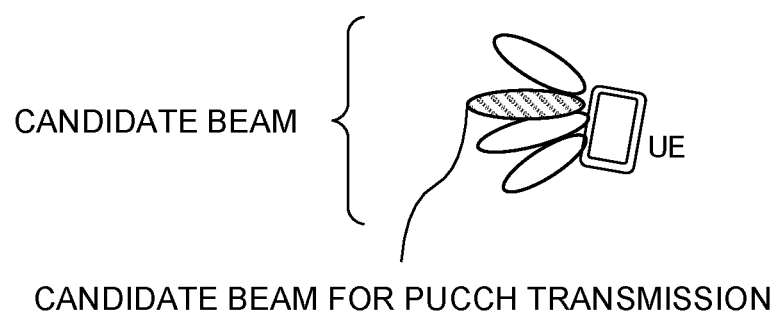
FIG. 1 is a diagram to show examples of a number of candidate beams for PUCCH transmission.

Studies are underway to configure a number of candidate beams for PUCCH transmission, as shown in FIG. 1, by using PUCCH spatial relation information. The PUCCH spatial relation information is reported to UE through higher layer signaling (for example, RRC signaling).

The PUCCH spatial relation information may be a list of configurations of spatial relations between reference RSs and PUCCH. The PUCCH spatial relation information includes at least one entry (PUCCH spatial relation information IE (Information Element)). Each entry may show IDs associated with reference RSs. To be more specific, every entry may include at least one of an SSB index, an NZP (Non-Zero Power)-CSI-RS resource configuration ID, and an SRS resource configuration ID. These SSB indices, NZP CSI-RS resource configuration IDs and SRS resource configuration IDs may be associated with beams, resources and/or ports that are selected by measuring reference RSs.

One of a number of entries (a candidate beam or PUCCH spatial relation information) may be specified by a MAC (Medium Access Control) CE (Control Element). If the PUCCH spatial relation information includes one PUCCH spatial relation information IE, no MAC CE may be used.

When the UE determines one entry, the UE may transmit PUCCH based on the PUCCH spatial relation information associated with that entry. If a downlink RS (SSB or CSI-RS) is used as a reference RS, the entry is associated with a receiving beam that is selected by measuring the reference RS, and the UE may transmit PUCCH by using a transmitting beam corresponding to the receiving beam associated with the entry. Alternatively, the base station receiver may transmit PUCCH by using a transmitting beam, precoding, an antenna port, an antenna panel and so forth that can assume spatial QCL (Quasi Co-Location) with the downlink RS (SSB or CSI-RS) associated with this entry. If an uplink RS (SRS) is used as a reference RS, the entry is associated with a transmitting beam that is selected by measuring the reference RS, and the UE may transmit PUCCH by using the transmitting beam associated with the entry. Alternatively, the base station receiver may transmit PUCCH by using a transmitting beam, precoding, an antenna port, an antenna panel and so forth that can assume spatial QCL with the uplink RS (SRS) associated with this entry. In the following description, for ease of explanation, the above-described PUCCH spatial relation information will be referred to as "PUCCH beams," "transmitting beams," "beams" and so forth.

Meanwhile, studies are underway to configure PUCCH resources dynamically by using DCI (Downlink Control Information). Consequently, the granularity of timings for controlling PUCCH beams by using MAC CEs is coarser than the granularity of timings for controlling PUCCH resources by using DCI. In other words, where one PUCCH resource is determined dynamically, it is difficult to specify one beam by using a MAC CE.

So, the present inventors have worked on the configuration of MAC CEs for controlling beams for PUCCH transmission, and arrived at the present invention.

Now, embodiments according to the present disclosure will be described below in detail with reference to the accompanying drawings. The herein-contained embodiments may be used individually, or may be used in combination.

A number of PUCCH resource sets may be configured by higher layer signaling (for example, RRC signaling). Each PUCCH resource set is comprised of a number of PUCCH resources. When UE transmits UCI (Uplink Control Information) by using a PUCCH, the UE determines one PUCCH resource set, from among a number of PUCCH resource sets, based on the UCI's payload. The UE determines one PUCCH resource from the determined PUCCH resource set, based on a PUCCH resource indication.

The PUCCH resource indication may be a DCI indication (a specific field in DCI), a specific parameter (implicit indication), or a combination of these. The specific parameter may be at least one of a CCE (Control Channel Element) index, a specific PRB (Physical Resource Block) index in a PDSCH that is scheduled, a UE-ID, and a C-RNTI (Cell-Radio Network Temporary Identifier).

The UE may determine the PUCCH resource based on the type of the UCI. For example, when the UCI is comprised only of CSI (Channel State Information), the UE may determine one PUCCH resource for CSI that is configured by higher layer signaling. For example, when the UCI is an HARQ-ACK, the UE may determine a PUCCH resource set from among a number of PUCCH resource sets for the HARQ-ACK, which are configured by higher layer signaling, based on the number of HARQ-ACK bits, and determine a PUCCH resource based on a specific field in DCI for scheduling a PDSCH corresponding to the HARQ-ACK.

A MAC CE may show a number of entries that correspond, respectively, to a number of PUCCH resource candidates that can be specified by DCI, among a number of entries of PUCCH spatial relation information that are configured by higher layer signaling. This MAC CE may be referred to as a "spatial information MAC CE." The spatial information MAC CE may use an index of an entry (entry index) in PUCCH spatial relation information to show this entry.

The UE may control the beams for PUCCH by applying the entries shown in the spatial information MAC CE to PUCCH transmission.

Entries for PUCCH resources that may be configured dynamically are specified in advance by a spatial information MAC CE, so that the UE may control beams for dynamically-configured PUCCH resources.

Now, the configuration of the spatial information MAC CE will be described below. Note that, although slots will be exemplified hereinafter as time units, they may be replaced by any of symbols, subframes, subslots, radio frames and/or the like.

First Example

With a first example of the present disclosure, the configuration of a spatial information MAC CE that shows entries corresponding to all the PUCCH resource candidates, among a number of entries of PUCCH spatial relation information, will be described.

The spatial information MAC CE includes one indication field. The indication field accommodates a number of bits, and shows one entry for one PUCCH resource.

Which PUCCH resource this indication field is applied to depends on specific conditions. In other words, the UE applies the entry shown in the indication field to a PUCCH resource that fulfills a specific condition.

For example, when a spatial information MAC CE is scheduled in a slot n and this spatial information MAC CE is applied after a given period (for example, in slot n+8) or later, the indication field in this spatial information MAC CE may be applied to a given PUCCH resource that is transmitted at the timing after the above given period (for example, in slot n+8), or later. The above given PUCCH resource may be a PUCCH resource that is determined based on DCI that schedules the PDSCH to carry the MAC CE, or may be the first PUCCH resource which is transmitted in slot n+8 or later, and in which a PUCCH spatial relation information indication by the MAC CE is configured.

For example, the indication field in the spatial information MAC CE may be applied to the PUCCH resource to be used for an HARQ-ACK in response to the PDSCH carrying this spatial information MAC CE.

For example, the indication field in the spatial information MAC CE may be the first PUCCH resource which is transmitted after the above given period (for example, in slot n+8) or later, and in which a PUCCH spatial relation information indication by the MAC CE is possible (specification by the MAC CE is configured).

The indication field may show one entry for one PUCCH resource set.

According to the first example, the spatial information MAC CE includes one indication field for one PUCCH resource, so that the amount of information with the spatial information MAC CE can be reduced. Also, the spatial information MAC CE is applied to a PUCCH resource that fulfills a specific condition, so that, even when a number of PUCCH resources are configured, the spatial information MAC CE can be applied to an appropriate PUCCH resource.

Second Example

The spatial information MAC CE includes one or more indication fields (or spatial information indication fields). One indication field corresponds to one PUCCH resource, and shows one entry for that PUCCH resource, amongst the PUCCH spatial relation information.

The number of indication fields may depend on the number of PUCCH resources in one PUCCH resource set, or depend on the total number of PUCCH resources in all the PUCCH resource sets. Alternatively, the number of indication fields may depend on the number of PUCCH resources in one PUCCH resource set where a PUCCH spatial relation information indication by the MAC CE is configured, or depend on the total number of PUCCH resources in all the PUCCH resource sets where specification of PUCCH spatial relation information is configured.

Figure 2:
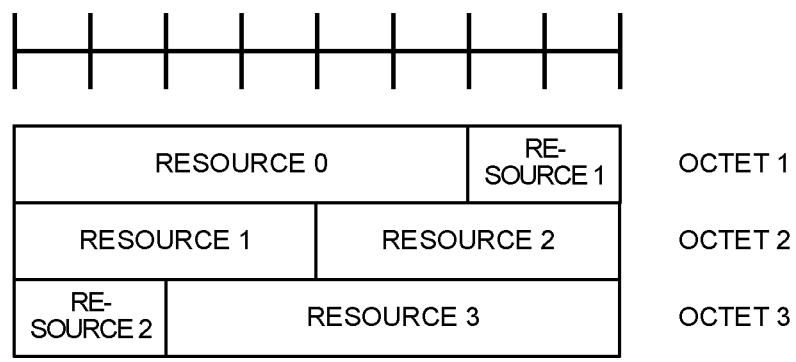
FIG. 2 is a diagram to show an example of the configuration of a spatial information MAC CE according to a second example of the present disclosure.

Each indication field has a given indication-field length. In the example of FIG. 2, the length of the indication field is six bits, but the length of the indication field is not limited to this. For example, the length of the indication field may be eight bits.

As shown in FIG. 2, when the spatial information MAC CE includes four indication fields that respectively correspond to four PUCCH resources 0 to 3, individual entries can be specified for the four PUCCH resources.

Each indication field may be a bitmap that specifies one entry. For example, the position of a bit set to "1" may show an entry index. When the length of an indication field is six bits, the indication field shows one of the six entries.

Each indication field may be a hard code (binary) that specifies one entry. For example, the value of an indication field may show an entry index. When the length of an indication field is six bits, the indication field shows one of two to the sixth power entries. Consequently, if an indication field is a hard code, more entries can be included in the PUCCH spatial relation information than when the indication field is a bitmap.

According to the second example, appropriate entries can be specified for a number of PUCCH resources. By means of this specification, appropriate beams can be applied to a number of PUCCH resources.

Third Example

With a third example of the present disclosure, the spatial information MAC CE includes a specific field (header field) that shows whether or not there is an indication field for each PUCCH resource.

The header field shows to which PUCCH resource the indication field included in the spatial information MAC CE corresponds. For example, the header field includes a number of bits $X_i$ (i=0, 1, . . . ). $X_i$ shows whether or not an indication field corresponding to PUCCH resource i is included in the spatial information MAC CE. For example, $X_i=1$ shows that an indication field for PUCCH resource i is included in the spatial information MAC CE. Here, PUCCH resource i may be an index i when all PUCCH resources are indexed, may be an index i when all the PUCCH resources included in a given PUCCH resource set are indexed, may be an index i when all the PUCCH resources where a PUCCH spatial relation information indication by the MAC CE is configured are indexed, or may be an index i when all the PUCCH resources where a PUCCH spatial relation information indication by the MAC CE included in a given PUCCH resource set is configured are indexed.

The spatial information MAC CE includes an indication field, the presence of which is shown with the header field. The indication field shows one entry.

Figure 3:
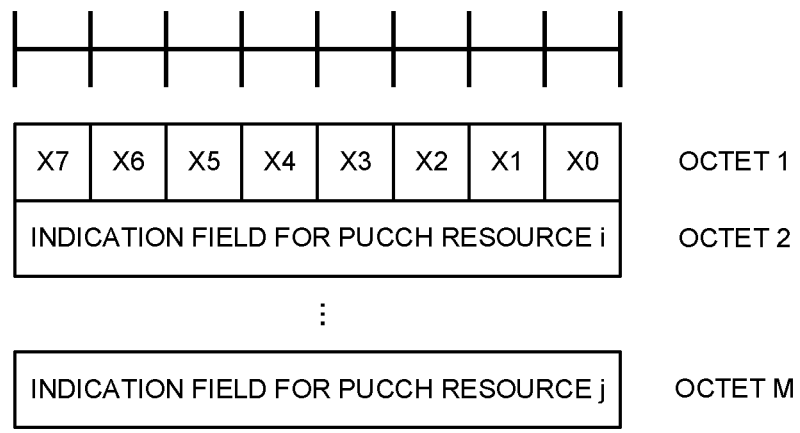
FIG. 3 is a diagram to show an example of the configuration of a spatial information MAC CE according to a third example of the present disclosure.

The header field may have a given header-field length. The indication field may have a given indication-field length. In the example of FIG. 3, the length of the header field and the length of the indication field are both eight bits, but this is by no means limiting. For example, the length of the header field and/or the length of the indication field may be six bits.

In octet 1, header fields $X_0$ to $X_7$ are allocated, and indication fields are allocated in octets 2 to M. Indication fields corresponding to PUCCH resources in which $X_i$ is 1 may be allocated in ascending order of i or in descending order of i.

In the example of FIG. 3, an example is shown in which at least $X_i$ and $X_j$ are 1 (j=0, 1, . . . , i<j). In octets 2 to M, at least an indication field corresponding to a PUCCH resource i and an indication field corresponding to a PUCCH resource j are allocated.

The total number M of octets in the spatial information MAC CE depends on the number of $X_i$ that is 1 in the header field.

Each indication field may be a bitmap that specifies one entry. For example, the position of a bit set to "1" may show an entry index. When the length of an indication field is eight bits, the indication field shows one of the eight entries.

Each indication field may be a hard code (binary) that specifies one entry. For example, the value of an indication field may show an entry index. When the length of an indication field is eight bits, the indication field shows one of two to the eighth power entries. Consequently, if an indication field is a hard code, more entries can be included in the PUCCH spatial relation information than when the indication field is a bitmap.

According to the third example, appropriate entries can be specified for a number of PUCCH resources. By means of this specification, appropriate beams can be applied to a number of PUCCH resources.

Also, according to the third example, the spatial information MAC CE does not need to include indication fields for all the PUCCH resources that may be used, so that the amount of information with the spatial MAC CE may be reduced. For example, when the beams of part of the PUCCH resources do not need to be switched, the spatial information MAC CE may not include indication fields for these PUCCH resources.

Fourth Example

With a fourth example of the present disclosure, the spatial information MAC CE includes a specific field (header field) that shows whether or not there is a set-indication field for each PUCCH resource set.

The header field shows to which PUCCH resource the set-indication field included in the spatial information MAC CE corresponds. For example, the header field includes a number of bits $X_i$ (i=0, 1, . . . ). $X_i$ indicates whether or not a set-indication field corresponding to PUCCH resource set i is included in the spatial information MAC CE. For example, $X_i$=1 shows that a set-indication field for PUCCH resource set i is included in the spatial information MAC CE.

$X_i$ may show that the set-indication field for PUCCH resource set i when PUCCH resource sets where a PUCCH spatial relation information indication by the MAC CE is configured for at least one PUCCH resource are indexed is the spatial information MAC CE. That is, $X_i$=1 indicates that a set-indication field for PUCCH resource set i where a PUCCH spatial relation information indication by the MAC CE is configured for at least one PUCCH resource is included in the spatial information MAC CE.

The spatial information MAC CE includes a set-indication field, the presence of which is shown with the header field. The set-indication field includes respective indication fields for all of the PUCCH resources included in the corresponding PUCCH resource set. The indication field shows one entry.

Figure 4:
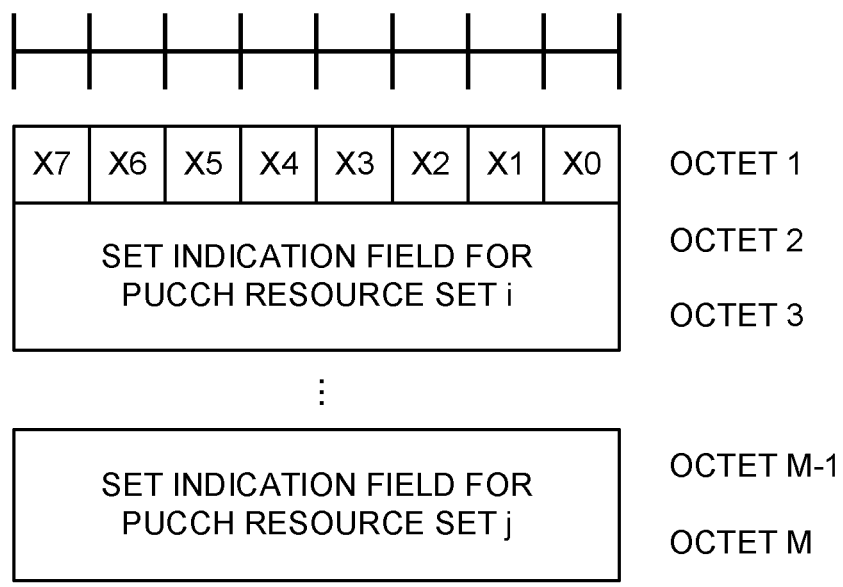
FIG. 4 is a diagram to show an example of the configuration of a spatial information MAC CE according to a fourth example of the present disclosure.

The header field may have a given header-field length. The indication field may have a given indication-field length. In the example of FIG. 4, the length of the header field and the length of the indication field are both eight bits, but this is by no means limiting. For example, the length of the header field and/or the length of the indication field may be six bits.

The set-indication field may have a given set-indication-field length. The number of PUCCH resources in a PUCCH resource set may be a given number, or may be equal to or less than the given number. In this case, the length of the set-indication field may be the length of the indication field×a given number.

In octet 1, header fields $X_0$ to $X_7$ are allocated, and set-indication fields are allocated in octets 2 to M. Set-indication fields corresponding to PUCCH resource sets in which $X_i$ is 1 may be allocated in ascending order of i or in descending order of i.

In the example of FIG. 4, an example is shown in which at least $X_i$ and $X_j$ are 1 (j=0, 1, . . . , i<j). In octets 2 to M, at least a set-indication field corresponding to a PUCCH resource set i and a set-indication field corresponding to a PUCCH resource set j are allocated.

The total number M of octets in the spatial information MAC CE depends on the number of $X_i$ that is 1 in the header field.

Each indication field may be a bitmap that specifies one entry. For example, the position of a bit set to "1" may show an entry index. When the length of an indication field is eight bits, the indication field shows one of the eight entries.

Each indication field may be a hard code (binary) that specifies one entry. For example, the value of an indication field may show an entry index. When the length of an indication field is eight bits, the indication field shows one of two to the eighth power entries. Consequently, if an indication field is a hard code, more entries can be included in the PUCCH spatial relation information than when the indication field is a bitmap.

According to the fourth example, appropriate entries can be specified for a number of PUCCH resources. By means of this specification, appropriate beams can be applied to a number of PUCCH resources.

Also, according to the fourth example, the spatial information MAC CE does not need to include set-indication fields for all the PUCCH resource sets that may be used, so that the amount of information with the spatial MAC CE may be reduced. For example, when the beams of part of the PUCCH resource sets do not need to be switched, the spatial information MAC CE may not include set-indication fields for these PUCCH resource sets.

Also, the header field shows whether or not there is an indication field for each PUCCH resource set, so that the length of the header field can be reduced even when the total number of PUCCH resources is large.

Fifth Example

Individual LCIDs (Logical Channel IDentifiers) may be defined for spatial information MAC CEs for one or more PUCCHs.

Figure 5:
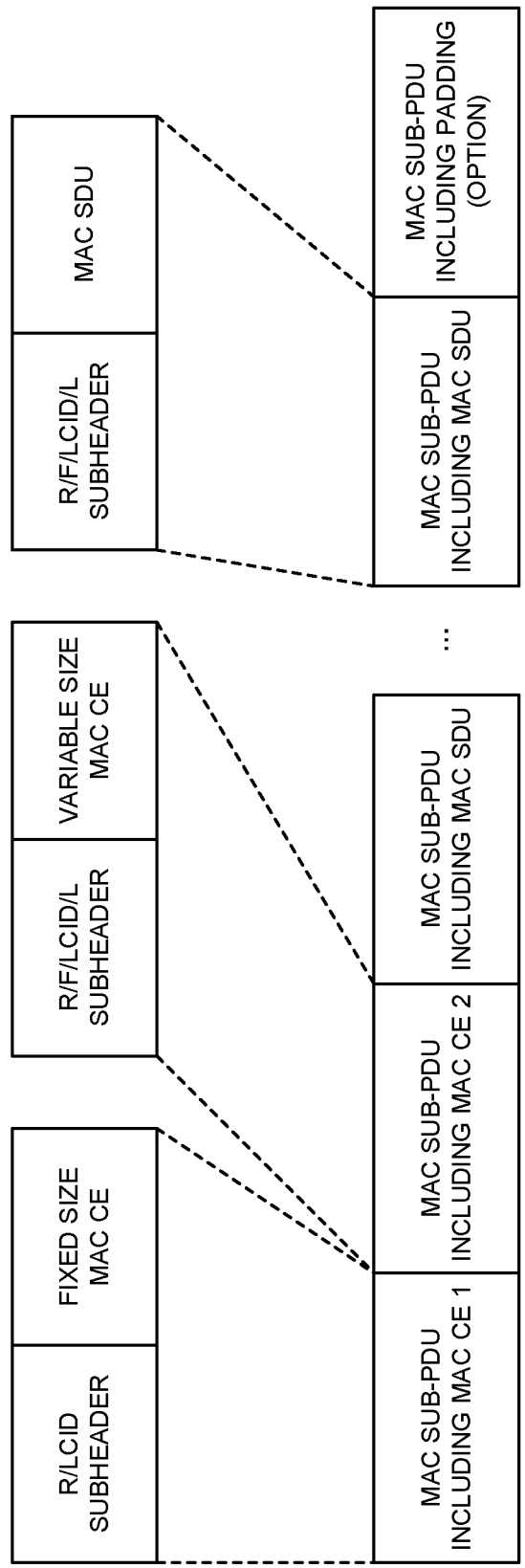
FIG. 5 is a diagram to show an example of the configuration of a MAC PDU.

FIG. 5 is a diagram to show an example of the configuration of a MAC PDU (Protocol Data Unit). The MAC PDU is comprised of a number of MAC sub-PDUs. A MAC sub-PDU includes one of a MAC CE, a MAC SDU (Service Data Unit), and padding. An R/LCID MAC subheader is attached to a fixed-size MAC CE (FIG. 6C), and an R/F/LCID/L MAC subheader is attached to a variable-size MAC CE and MAC SDU (FIG. 6A or FIG. 6B).

Figure 6A:
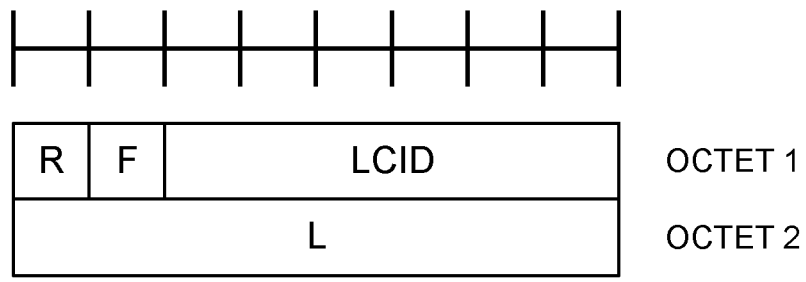
FIGS. 6A to 6C are diagrams to show examples of the configuration of MAC subheaders.
Figure 6B:
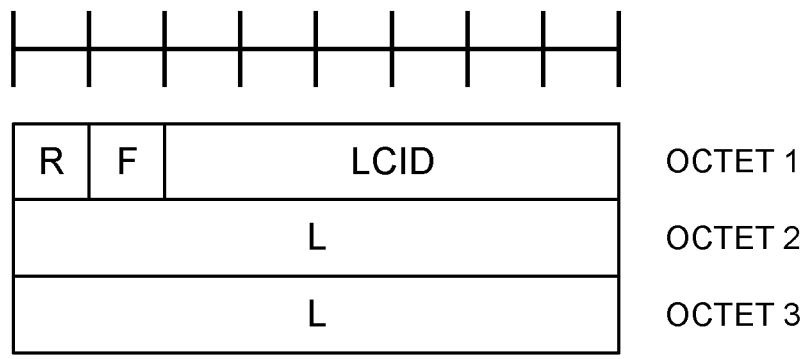
Figure 6C:
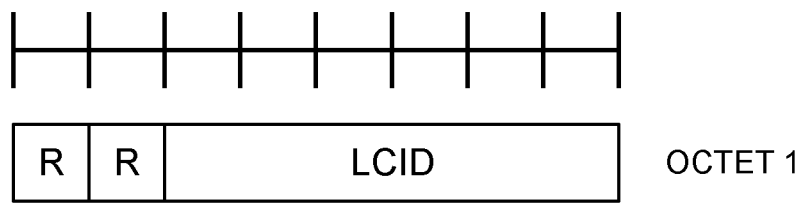

FIG. 6A shows the configuration of an R/F/LCID/L MAC subheader having an eight-bit length field. FIG. 6B shows the configuration of an R/F/LCID/L MAC subheader having a sixteen-bit length field. FIG. 6C shows the configuration of a R/LCID MAC subheader.

L is a length field that shows the length of a corresponding MAC SDU or variable-size MAC CE in bytes. F is a one-bit format field that shows the size of the length field. The value 0 shows an eight-bit length field, and the value 1 shows a sixteen-bit length field. R is a reserved bit and is set to 0.

The LCID field shows the corresponding MAC SDU's logical channel instance, the corresponding MAC CE's type, or padding for a DL-SCH (DownLink-Shared CHannel) and a UL-SCH (UpLink-Shared CHannel). There is one LCID field for every MAC subheader. The LCID field size may be six bits.

The spatial information MAC CE for a PUCCH, such as those described in the first to fourth examples, may include an individual LCID, so that UE can recognize the configuration of the spatial information MAC CE for the PUCCH based on the LCID, and control the beams for the PUCCH properly.

Also, a spatial information MAC CE for a PDCCH may be defined, or a spatial information MAC CE for a PDSCH may be defined. Furthermore, different LCIDs may be defined for a spatial information MAC CE for a PUCCH, a spatial information MAC CE for a PDCCH, and a spatial information MAC CE for a PDSCH. Based on the decoded LCID of the MAC CE, UE can recognize the configuration of the spatial information MAC CE of a specific channel and control the beams to use for transmission or receipt properly.

(Radio Communication System)

Now, the structure of a radio communication system according to the present embodiment will be described below. In this radio communication system, communication is performed using at least one of the above examples or a combination of them.

Figure 7:
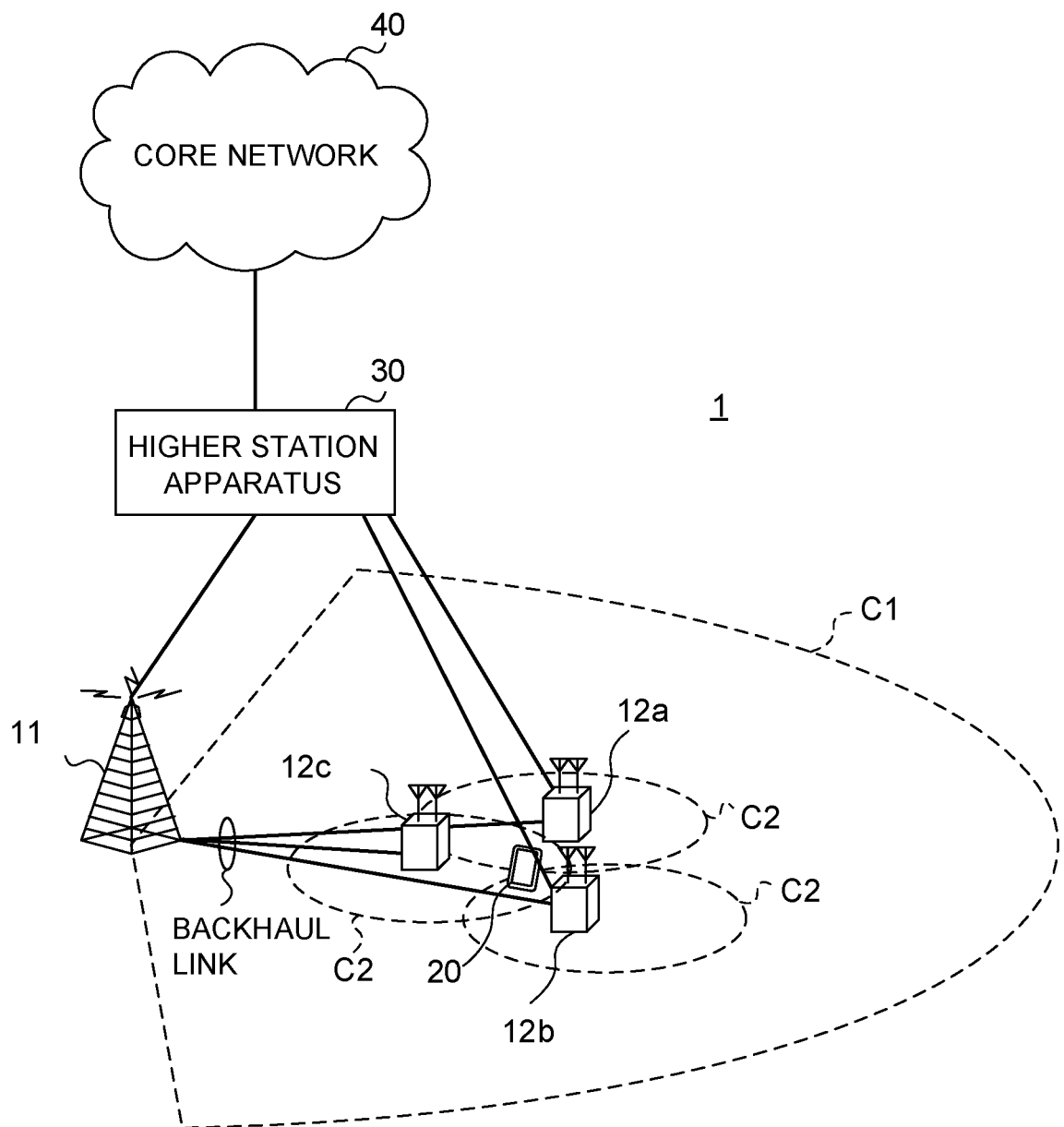
FIG. 7 is a diagram to show an exemplary schematic structure of a radio communication system according to the present embodiment.

FIG. 7 is a diagram to show an exemplary schematic structure of a radio communication system according to the present embodiment. A radio communication system 1 can adopt carrier aggregation (CA) and/or dual connectivity (DC) to group a number of fundamental frequency blocks (component carriers) into one, where the LTE system bandwidth (for example, 20 MHz) constitutes one unit.

Note that the radio communication system 1 may be referred to as "LTE (Long-term evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "NR (New Radio)," "FRA (Future Radio Access)," "New-RAT (Radio Access Technology)," and so on, or may be seen as a system to implement these.

The radio communication system 1 includes a radio base station 11 that forms a macro cell C1, with a relatively wide coverage, and radio base stations 12 (12a to 12c) that are placed within the macro cell C1 and that form small cells C2, which are narrower than the macro cell C1. Also, user terminals 20 are placed in the macro cell C1 and in each small cell C2. The arrangement and number of cells and user terminals 20 and so forth are not limited to those illustrated in the drawings.

The user terminals 20 can connect with both the radio base station 11 and the radio base stations 12. The user terminals 20 might use the macro cell C1 and the small cells C2 at the same time by means of CA or DC. Furthermore, the user terminals 20 may apply CA or DC using a number of cells (CCs) (for example, five or fewer CCs or six or more CCs).

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the structure of the frequency band for use in each radio base station is by no means limited to these.

Furthermore, the user terminals 20 can communicate by using time division duplexing (TDD) and/or frequency division duplexing (FDD), in each cell. Furthermore, in each cell (carrier), a single numerology may be used, or a number of different numerologies may be used.

A numerology may refer to a communication parameter that is applied to transmission and/or receipt of a given signal and/or channel, and represent at least one of the subcarrier spacing, the bandwidth, the duration of symbols, the length of cyclic prefixes, the duration of subframes, the length of TTIs, the number of symbols per TTI, the radio frame configuration, the filtering process, the windowing process, and so on.

The radio base station 11 and a radio base station 12 (or two radio base stations 12) may be connected with each other by cables (for example, by optical fiber, which is in compliance with the CPRI (Common Public Radio Interface), the X2 interface and so on), or by radio.

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but these are by no means limiting. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations each having a local coverage, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter, the radio base stations 11 and 12 will be collectively referred to as "radio base stations 10," unless specified otherwise.

The user terminals 20 are terminals that support various communication schemes such as LTE, LTE-A and so on, and may be either mobile communication terminals (mobile stations) or stationary communication terminals (fixed stations).

In the radio communication system 1, as radio access schemes, orthogonal frequency division multiple access (OFDMA) is applied to the downlink, and single-carrier frequency division multiple access (SC-FDMA) and/or OFDMA are applied to the uplink.

OFDMA is a multi-carrier communication scheme to perform communication by dividing a frequency bandwidth into a number of narrow frequency bandwidths (subcarriers) and mapping data to each subcarrier. SC-FDMA is a single-carrier communication scheme to mitigate interference between terminals by dividing the system bandwidth into bands that are each formed with one or contiguous resource blocks, per terminal, and allowing a number of terminals to use mutually different bands. Note that the uplink and downlink radio access schemes are not limited to the combinations of these, and other radio access schemes may be used as well.

In the radio communication system 1, a downlink shared channel (PDSCH (Physical Downlink Shared CHannel)), which is used by each user terminal 20 on a shared basis, a broadcast channel (PBCH (Physical Broadcast CHannel)), downlink L1/L2 control channels and so on are used as downlink channels. User data, higher layer control information, SIBs (System Information Blocks) and so on are communicated in the PDSCH. Also, the MIB (Master Information Blocks) is communicated in the PBCH.

The L1/L2 control channels include at least one of DL control channels (such as a PDCCH (Physical Downlink Control CHannel) and/or an EPDCCH (Enhanced Physical Downlink Control CHannel)), a PCFICH (Physical Control Format Indicator CHannel), and a PHICH (Physical Hybrid-ARQ Indicator CHannel). Downlink control information (DCI), which includes PDSCH and/or PUSCH scheduling information and so on, is communicated by the PDCCH.

Note that scheduling information may be reported in DCI. For example, the DCI to schedule receipt of DL data may be referred to as "DL assignment," and the DCI to schedule transmission of UL data may also be referred to as "UL grant."

The number of OFDM symbols to use for the PDCCH is communicated by the PCFICH. HARQ (Hybrid Automatic Repeat reQuest) delivery acknowledgment information (also referred to as, for example, "retransmission control information," "HARQ-ACKs," "ACK/NACKs," etc.) in response to the PUSCH is transmitted by the PHICH. The EPDCCH is frequency-division-multiplexed with the PDSCH (downlink shared data channel) and used to communicate DCI and so on, like the PDCCH.

In the radio communication system 1, an uplink shared channel (PUSCH (Physical Uplink Shared CHannel)), which is used by each user terminal 20 on a shared basis, an uplink control channel (PUCCH (Physical Uplink Control CHannel)), a random access channel (PRACH (Physical Random Access CHannel)) and so on are used as uplink channels. User data, higher layer control information and so on are communicated by the PUSCH. Also, in the PUCCH, downlink radio quality information (CQI (Channel Quality Indicator)), delivery acknowledgment information, scheduling requests (SRs) and so on are communicated. By means of the PRACH, random access preambles for establishing connections with cells are communicated.

In the radio communication system 1, cell-specific reference signals (CRSs), channel state information reference signals (CSI-RSs), demodulation reference signals (DMRSs), positioning reference signals (PRSs) and so on are communicated as downlink reference signals. Also, in the radio communication system 1, measurement reference signals (SRSs (Sounding Reference Signals)), demodulation reference signals (DMRSs) and so on are communicated as uplink reference signals. Note that the DMRSs may be referred to as "user terminal-specific reference signals (UE-specific reference signals)." Also, the reference signals to be communicated are by no means limited to these.

<Radio Base Station>

Figure 8:
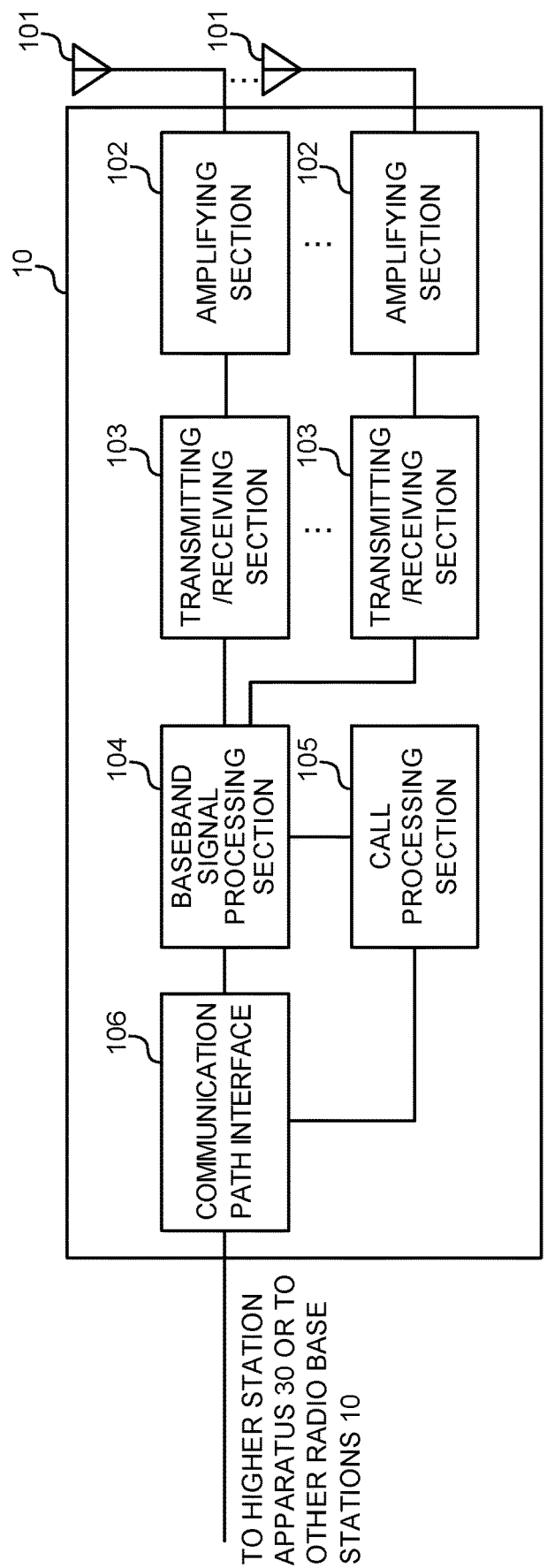
FIG. 8 is a diagram to show an exemplary overall structure of a radio base station according to the present embodiment.

FIG. 8 is a diagram to show an exemplary overall structure of a radio base station according to the present embodiment. A radio base station 10 has a number of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30, to the baseband signal processing section 104, via the communication path interface 106.

In the baseband signal processing section 104, the user data is subjected to transmission processes, including a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (such as setting up and releasing communication channels), manages the state of the radio base station 10, and manages the radio resources.

The communication path interface section 106 transmits and receives signals to and from the higher station apparatus 30 via a given interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

Note that the transmitting/receiving sections 103 may furthermore have an analog beamforming section where analog beamforming takes place. The analog beamforming section may be constituted by an analog beamforming circuit (for example, a phase shifter, a phase shifting circuit, etc.) or analog beamforming apparatus (for example, a phase shifting device) that can be described based on general understanding of the technical field to which the present invention pertains. Furthermore, the transmitting/receiving antennas 101 may be constituted by, for example, array antennas. In addition, the transmitting/receiving sections 103 are designed so that single-BF or multiple-BF operations can be used.

Also, the transmitting/receiving sections 103 may transmit and/or receive signals using given beams that are determined by the control section 301.

Also, the transmitting/receiving sections 103 may transmit, through higher layer signaling, a number of entries of information related to a spatial resource for an uplink control channel. Furthermore, the transmitting/receiving sections 103 may transmit specifying information that specifies, amongst the above entries, entries that correspond to a number of uplink control channel resources, respectively, by means of a control element of media access control.

Also, the transmitting/receiving sections 103 may transmit downlink control information (DCI) and/or other parameters for determining one uplink control channel resource in an uplink control channel resource set.

Figure 9:
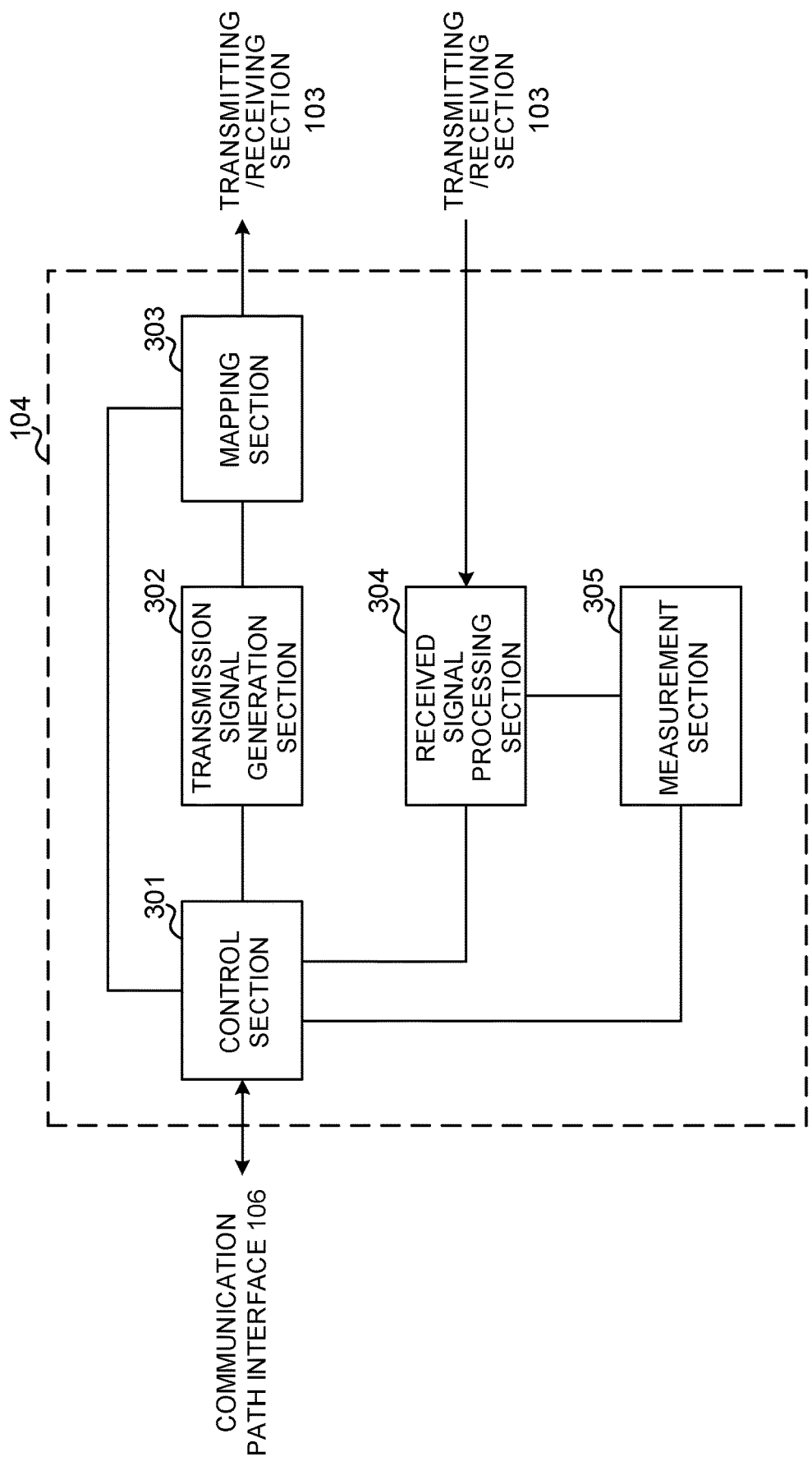
FIG. 9 is a diagram to show an exemplary functional structure of a radio base station according to the present embodiment.

FIG. 9 is a diagram to show an exemplary functional structure of a radio base station according to the present embodiment. Note that, although this example primarily shows functional blocks that pertain to characteristic parts of the present embodiment, the radio base station 10 might have other functional blocks that are necessary for radio communication as well.

The baseband signal processing section 104 at least has a control section (scheduler) 301, a transmission signal generation section 302, a mapping section 303, a received signal processing section 304 and a measurement section 305. Note that these configurations have only to be included in the radio base station 10, and part or all of these configurations may not be included in the baseband signal processing section 104.

The control section (scheduler) 301 controls the whole of the radio base station 10. The control section 301 can be constituted by a controller, a control circuit or control apparatus that can be described based on general understanding of the technical field to which the present invention pertains.

The control section 301 controls, for example, generation of signals in the transmission signal generation section 302, allocation of signals in the mapping section 303, and so on. Furthermore, the control section 301 controls signal receiving processes in the received signal processing section 304, measurements of signals in the measurement section 305, and so on.

The control section 301 controls the scheduling (for example, resource allocation) of system information, downlink data signals (for example, signals transmitted in the PDSCH) and downlink control signals (for example, signals transmitted in the PDCCH and/or the EPDCCH, such as delivery acknowledgment information). Also, the control section 301 controls the generation of downlink control signals, downlink data signals, and so on based on the results of deciding whether or not retransmission control is necessary for uplink data signals, and so on.

The control section 301 controls scheduling of synchronization signals (for example, PSS/SSS), downlink reference signals (for example, CRS, CSI-RS, DMRS, etc.) and the like.

The control section 301 may exert control so that transmitting beams and/or receiving beams are formed by using digital BF (for example, precoding) in the baseband signal processing section 104 and/or analog BF (for example, phase rotation) in the transmitting/receiving sections 103.

The transmission signal generation section 302 generates downlink signals (downlink control signals, downlink data signals, downlink reference signals, and so on) based on commands from the control section 301, and outputs these signals to the mapping section 303. The transmission signal generation section 302 can be constituted by a signal generator, a signal generating circuit or signal generating apparatus that can be described based on general understanding of the technical field to which the present invention pertains.

For example, the transmission signal generation section 302 generates DL assignments, which report downlink data allocation information, and/or UL grants, which report uplink data allocation information, based on commands from the control section 301. DL assignments and UL grants are both DCI, in compliance with DCI format. Also, the downlink data signals are subjected to the coding process, the modulation process and so on, by using coding rates, modulation schemes and the like that are determined based on, for example, channel state information (CSI) from each user terminal 20.

The mapping section 303 maps the downlink signals generated in the transmission signal generation section 302 to given radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals include, for example, uplink signals transmitted from the user terminal 20 (uplink control signals, uplink data signals, uplink reference signals, etc.). The received signal processing section 304 can be constituted by a signal processor, a signal processing circuit or signal processing apparatus that can be described based on general understanding of the technical field to which the present invention pertains.

The received signal processing section 304 outputs the decoded information acquired through the receiving processes, to the control section 301. For example, when a PUCCH to contain an HARQ-ACK is received, the received signal processing section 304 outputs this HARQ-ACK to the control section 301. Also, the received signal processing section 304 outputs the received signals and/or the signals after the receiving processes to the measurement section 305.

The measurement section 305 conducts measurements with respect to the received signals. The measurement section 305 can be constituted by a measurer, a measurement circuit or measurement apparatus that can be described based on general understanding of the technical field to which the present invention pertains.

For example, the measurement section 305 may perform RRM (Radio Resource Management) measurements, CSI (Channel State Information) measurements, and so on, based on the received signals. The measurement section 305 may measure the received power (for example, RSRP (Reference Signal Received Power)), the received quality (for example, RSRQ (Reference Signal Received Quality), SINR (Signal to Interference plus Noise Ratio), SNR (Signal to Noise Ratio), etc.), the signal strength (for example, RSSI (Received Signal Strength Indicator)), transmission path information (for example, CSI) and so on. The measurement results may be output to the control section 301.

<User Terminal>

Figure 10:
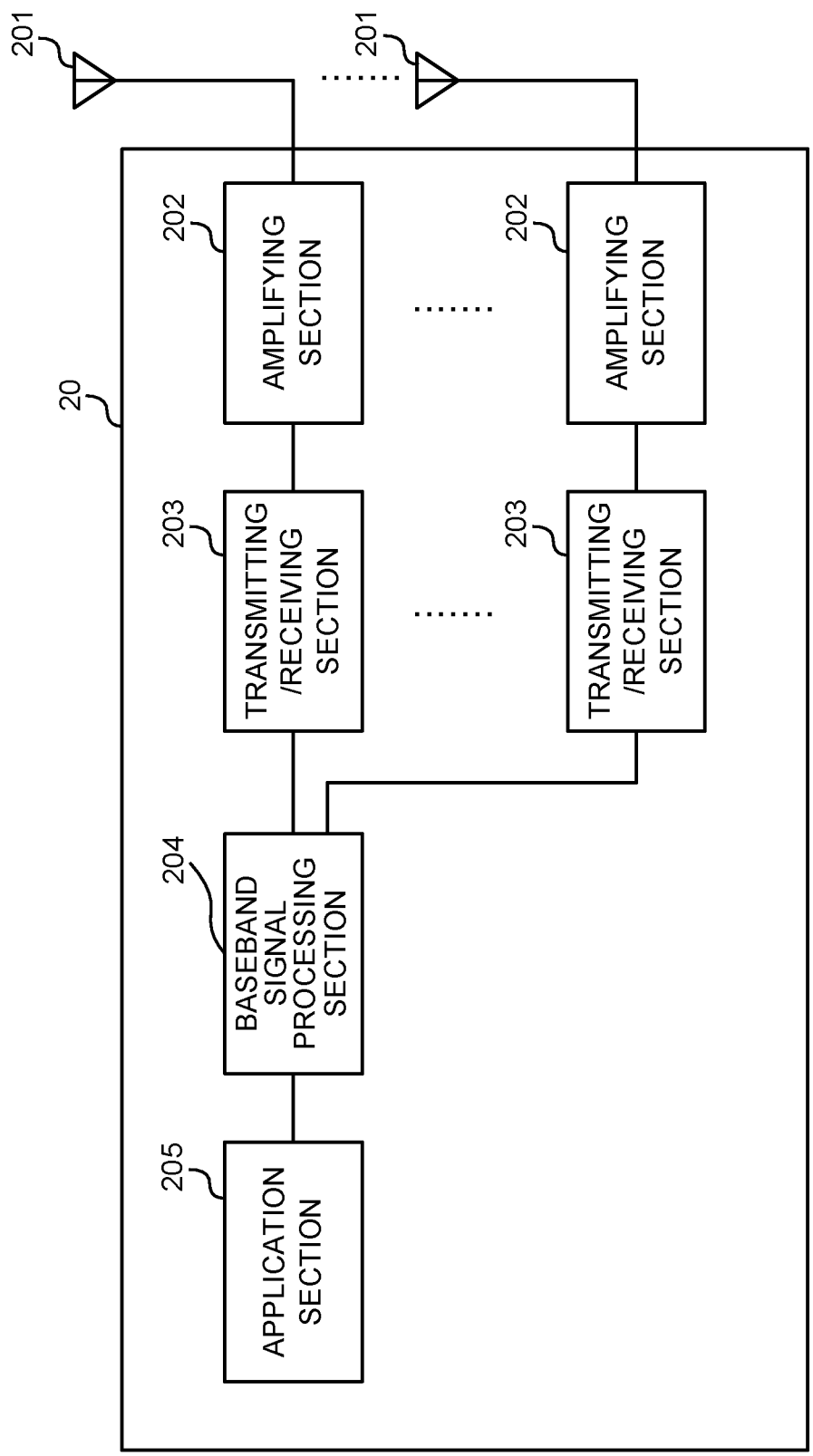
FIG. 10 is a diagram to show an exemplary overall structure of a user terminal according to the present embodiment.

FIG. 10 is a diagram to show an exemplary overall structure of a user terminal according to the present embodiment. A user terminal 20 has a number of transmitting/receiving antennas 201, amplifying sections 202, transmitting/receiving sections 203, a baseband signal processing section 204, and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the downlink signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

The baseband signal processing section 204 performs, for the baseband signal that is input, an FFT process, error correction decoding, a retransmission control receiving process, and so on. Downlink user data is forwarded to the application section 205. The application section 205 performs processes related to higher layers above the physical layer and the MAC layer, and so on. Also, in the downlink data, the broadcast information can be also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving sections 203.

Baseband signals that are output from the baseband signal processing section 204 are converted into a radio frequency band in the transmitting/receiving sections 203, and transmitted. The radio frequency signals that are subjected to frequency conversion in the transmitting/receiving sections 203 are amplified in the amplifying sections 202, and transmitted from the transmitting/receiving antennas 201.

Note that the transmitting/receiving sections 203 may further have an analog beamforming section where analog beamforming takes place. The analog beamforming section may be constituted by an analog beamforming circuit (for example, a phase shifter, a phase shifting circuit, etc.) or analog beamforming apparatus (for example, a phase shifting device) that can be described based on general understanding of the technical field to which the present invention pertains. Furthermore, the transmitting/receiving antennas 201 may be constituted by, for example, array antennas. In addition, the transmitting/receiving sections 203 are structured so that single-BF and multiple-BF can be used.

Also, the transmitting/receiving sections 203 may transmit and/or receive signals by using given beams determined in the control section 401.

Also, the transmitting/receiving sections 203 may receive, through higher layer signaling (for example, RRC signaling), a number of entries of information (for example, IDs that show RSs associated with beams) related to spatial resources (for example, beams) for an uplink control channel (for example, PUCCH). Furthermore, the transmitting/receiving sections 203 may receive specifying information (for example, an indication field) that specifies entries corresponding to at least one of a number of uplink control channel resources, among the above entries, by means of a control element of media access control (for example, spatial information MAC CE).

Furthermore, the transmitting/receiving sections 203 may receive specifying information that specifies entries that correspond to a number of uplink control channel resources, respectively, among the above entries, by means of a control element of media access control.

Figure 11:
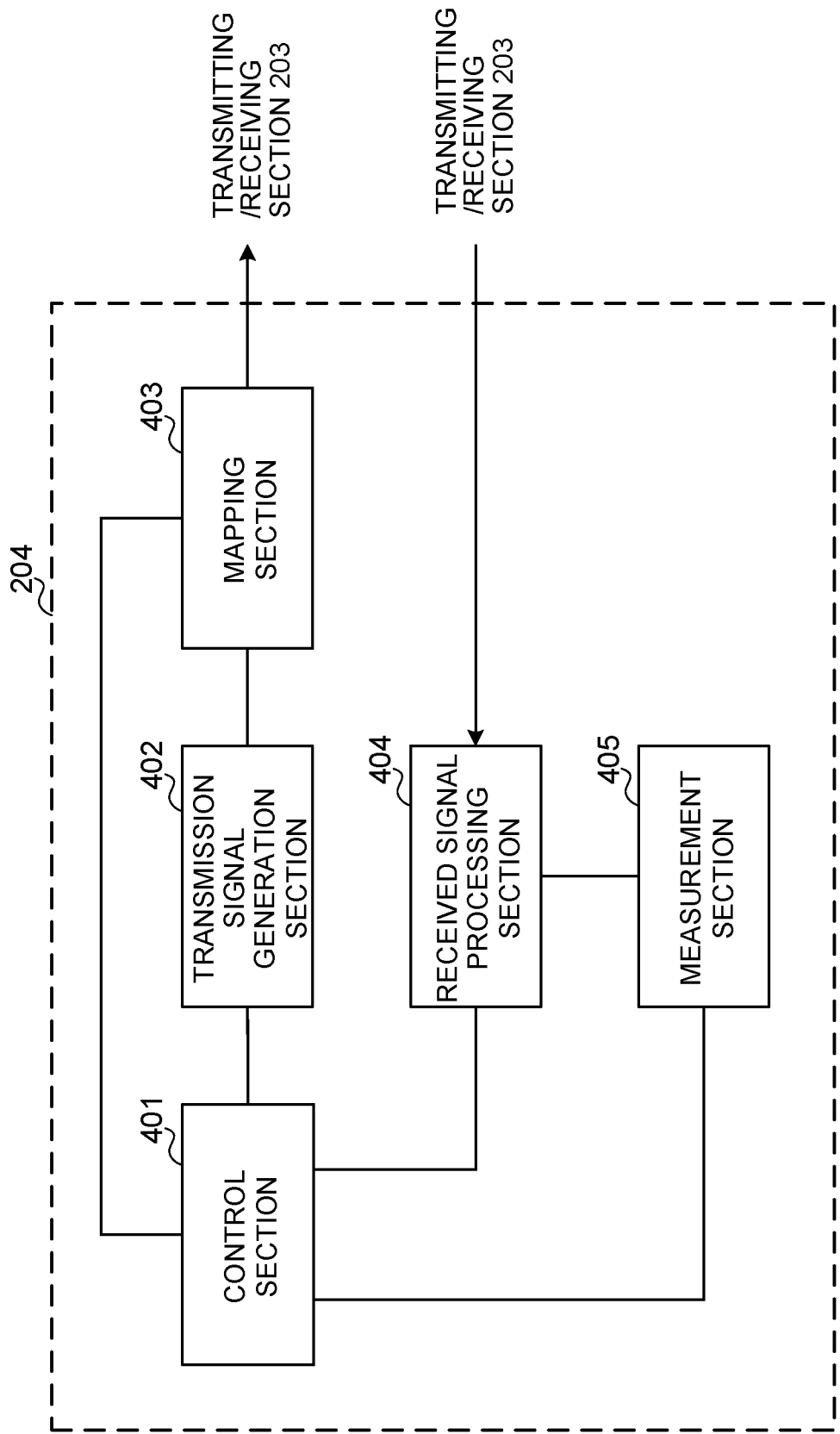
FIG. 11 is a diagram to show an exemplary functional structure of a user terminal according to the present embodiment.

FIG. 11 is a diagram to show an exemplary functional structure of a user terminal according to the present embodiment. Note that, although this example primarily shows functional blocks that pertain to characteristic parts of present embodiment, the user terminal 20 might have other functional blocks that are necessary for radio communication as well.

The baseband signal processing section 204 provided in the user terminal 20 at least has a control section 401, a transmission signal generation section 402, a mapping section 403, a received signal processing section 404, and a measurement section 405. Note that these configurations have only to be included in the user terminal 20, and part or all of these configurations may not be included in the baseband signal processing section 204.

The control section 401 controls the whole of the user terminal 20. The control section 401 can be constituted by a controller, a control circuit or control apparatus that can be described based on general understanding of the technical field to which the present invention pertains.

The control section 401 controls, for example, generation of signals in the transmission signal generation section 402, allocation of signals in the mapping section 403, and so on. Furthermore, the control section 401 controls signal receiving processes in the received signal processing section 404, measurements of signals in the measurement section 405, and so on.

The control section 401 acquires the downlink control signals and downlink data signals transmitted from the radio base station 10, via the received signal processing section 404. The control section 401 controls the generation of uplink control signals and/or uplink data signals based on results of deciding whether or not retransmission control is necessary for the downlink control signals and/or downlink data signals, and so on.

The control section 401 may exert control so that transmitting beams and/or receiving beams are formed by using digital BF (for example, precoding) in the baseband signal processing section 204 and/or by using analog BF (for example, phase rotation) in the transmitting/receiving sections 203.

The control section 401 may control radio link monitoring (RLM) and/or beam recovery (BR) based on measurement results in the measurement section 405.

Also, the control section 401 may control the determination of one of a number of uplink control channel resources. Furthermore, the control section 401 may control the transmission of an uplink control channel using an entry that corresponds to the determined uplink control channel resource, amongst the specified entries.

Also, in the control section 401, the specifying information may have a given size (for example, six bits, eight bits, etc.).

Also, a control element (for example, a spatial information MAC CE) may include a header (for example, a header field). The header may show, among a number of uplink control channel resources, an uplink control channel resource that corresponds to specifying information included in a control element (third example).

Also, in the control section 401, a number of uplink control channel resource sets may be configured. These multiple uplink control channel resource sets may each comprise at least one uplink control channel resource. A control element may include a header. The header may show, among a number of uplink control channel resources, an uplink control channel resource that corresponds to specifying information included in a control element.

Also, the control element may include a logical channel identifier (for example, an LCID) for information related to a spatial resource of an uplink control channel.

Also, the control section 401 may determine one of a number of uplink control channel resource sets based on uplink control information (UCI) transmitted by uplink control channel. Furthermore, the control section 401 may determine one uplink control channel resource from the uplink control channel resource set based on downlink control information (DCI).

The transmission signal generation section 402 generates uplink signals (uplink control signals, uplink data signals, uplink reference signals, etc.) based on commands from the control section 401, and outputs these signals to the mapping section 403. The transmission signal generation section 402 can be constituted by a signal generator, a signal generating circuit, or signal generation apparatus that can be described based on general understanding of the technical field to which the present invention pertains.

For example, the transmission signal generation section 402 generates uplink control signals such as delivery acknowledgement information, channel state information (CSI) and so on, based on commands from the control section 401. Also, the transmission signal generation section 402 generates uplink data signals based on commands from the control section 401. For example, when a UL grant is included in a downlink control signal that is reported from the radio base station 10, the control section 401 commands the transmission signal generation section 402 to generate an uplink data signal.

The mapping section 403 maps the uplink signals generated in the transmission signal generation section 402 to radio resources based on commands from the control section 401, and outputs these to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) for received signals that are input from the transmitting/receiving sections 203. Here, the received signals include, for example, downlink signals (downlink control signals, downlink data signals, downlink reference signals, and so on) that are transmitted from the radio base station 10. The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present disclosure.

The received signal processing section 404 outputs the decoded information acquired through the receiving processes, to the control section 401. The received signal processing section 404 outputs, for example, broadcast information, system information, RRC signaling, DCI and so on, to the control section 401. Also, the received signal processing section 404 outputs the received signals and/or the signals after the receiving processes to the measurement section 405.

The measurement section 405 conducts measurements with respect to the received signals. The measurement section 405 can be constituted by a measurer, a measurement circuit or measurement apparatus that can be described based on general understanding of the technical field to which the present invention pertains.

For example, the measurement section 405 may perform RRM measurements, CSI measurements, and so on, based on the received signals. The measurement section 405 may measure the received power (for example, RSRP), the received quality (for example, RSRQ, SINR, SNR, etc.), the signal strength (for example, RSSI), transmission path information (for example, CSI), and so on. The measurement results may be output to the control section 401.

<Hardware Structure>

Note that the block diagrams that have been used to describe the present embodiment show blocks in functional units. These functional blocks (components) may be implemented in arbitrary combinations of hardware and/or software. Also, the method for implementing each functional block is not particularly limited. That is, each functional block may be realized by one piece of apparatus that is physically and/or logically aggregated, or may be realized by directly and/or indirectly connecting two or more physically and/or logically-separate pieces of apparatus (by using cables and/or radio, for example) and using these multiple pieces of apparatus.

Figure 12:
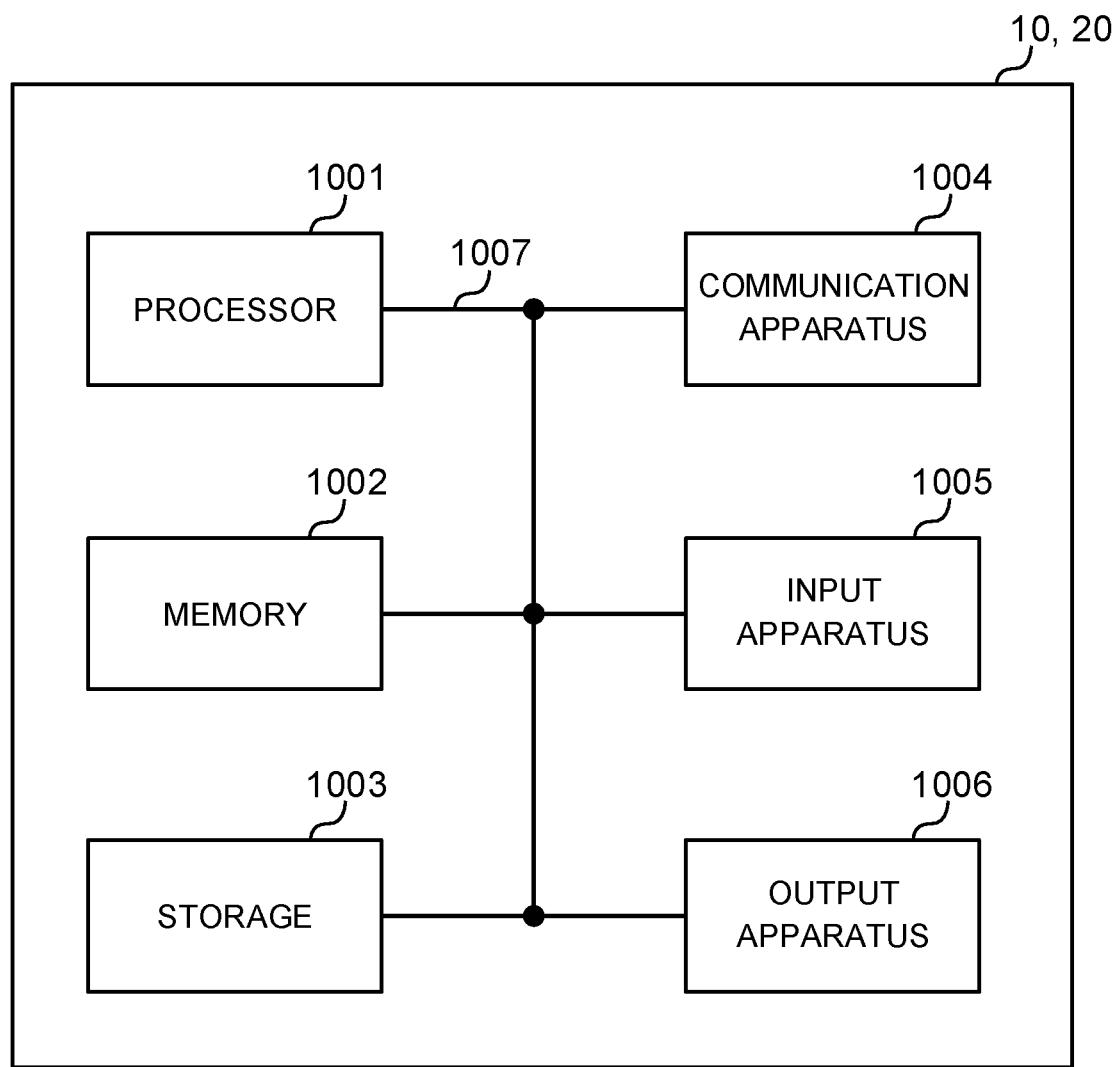
FIG. 12 is a diagram to show an exemplary hardware structure of a radio base station and a user terminal according to the present embodiment.

For example, the radio base station, user terminals, and so on according to the present embodiment may function as a computer that executes the processes of each example of the present embodiment. FIG. 12 is a diagram to show an exemplary hardware structure of a radio base station and a user terminal according to the present embodiment. Physically, the above-described radio base stations 10 and user terminals 20 may be formed as a computer apparatus that includes a processor 1001, a memory 1002, a storage 1003, communication apparatus 1004, input apparatus 1005, output apparatus 1006, a bus 1007 and so on.

Note that, in the following description, the term "apparatus" may be replaced by "circuit," "device," "unit" and so on. The hardware structure of a radio base station 10 and a user terminal 20 may be designed to include one or more of each apparatus shown in the drawings, or may be designed not to include part of the apparatus.

For example, although only one processor 1001 is shown, a plurality of processors may be provided. Furthermore, processes may be implemented with one processor, or processes may be implemented simultaneously or in sequence, or by using different techniques, on one or more processors. Note that the processor 1001 may be implemented with one or more chips.

The functions of the radio base station 10 and the user terminal 20 are implemented by, for example, allowing hardware such as the processor 1001 and the memory 1002 to read given software (programs), and allowing the processor 1001 to do calculations, control communication that involves the communication apparatus 1004, control the reading and/or writing of data in the memory 1002 and the storage 1003, and so on.

The processor 1001 may control the whole computer by, for example, running an operating system. The processor 1001 may be constituted by a central processing unit (CPU), which includes interfaces with peripheral apparatus, control apparatus, computing apparatus, a register, and so on. For example, the above-described baseband signal processing section 104 (204), call processing section 105, and so on may be implemented by the processor 1001.

Furthermore, the processor 1001 reads programs (program codes), software modules, data and so forth from the storage 1003 and/or the communication apparatus 1004, into the memory 1002, and executes various processes according to these. As for the programs, programs to allow computers to execute at least part of the operations of the above-described embodiments may be used. For example, the control section 401 of a user terminal 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory), and other appropriate storage media. The memory 1002 may be referred to as a "register," a "cache," a "main memory (primary storage apparatus)," and so on. The memory 1002 can store executable programs (program codes), software modules, and so on for implementing the radio communication methods according to the present embodiment.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) or the like), a digital versatile disc, a Blu-ray (registered trademark) disk, etc.), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on, in order to implement, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from outside (for example, a keyboard, a mouse, a microphone, a switch, a button, a sensor and so on). The output apparatus 1006 is an output device for executing output to outside (for example, a display, a speaker, an LED (Light Emitting Diode) lamp, and so on). Note that the input apparatus 1005 and the output apparatus 1006 may be provided in an integrated structure (for example, a touch panel).

Furthermore, these pieces of apparatus, including the processor 1001, the memory 1002 and so on, are connected by the bus 1007, so as to communicate information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by these pieces of hardware. For example, the processor 1001 may be implemented with at least one of these pieces of hardware.

(Variations)

Note that, the terminology used in this specification and the terminology that is needed to understand this specification may be replaced by other terms that communicate the same or similar meanings. For example, "channels" and/or "symbols" may be replaced by "signals" (or "signaling"). Also, a signal may be a message. A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency," and so on.

Furthermore, a radio frame may be comprised of one or more periods (frames) in the time domain. One or more periods (frames) that constitute a radio frame may be each referred to as a "subframe." Furthermore, a subframe may be comprised of one or more slots in the time domain. A subframe may be a fixed time duration (for example, 1 ms) not dependent on the numerology.

Furthermore, a slot may be comprised of one or more symbols in the time domain (OFDM (Orthogonal Frequency Division Multiplexing) symbols, SC-FDMA (Single Carrier Frequency Division Multiple Access) symbols, and so on). Also, a slot may be a time unit based on numerology. Also, a slot may include a plurality of minislots. Each minislot may be comprised of one or more symbols in the time domain. Also, a minislot may be referred to as a "subslot."

A radio frame, a subframe, a slot, a minislot, and a symbol all refer to a unit of time in signal communication. A radio frame, a subframe, a slot, a minislot and a symbol may be each called by other applicable names. For example, one subframe may be referred to as a "transmission time interval (TTI)," or a plurality of consecutive subframes may be referred to as a "TTI," or one slot or one minislot may be referred to as a "TTI." That is, a subframe and/or a TTI may be a subframe (1 ms) in existing LTE, may be a shorter period than 1 ms (for example, one to thirteen symbols), or may be a longer period of time than 1 ms. Note that the unit to represent a TTI may be referred to as a "slot," a "minislot" and so on, instead of a "subframe."

Here, a TTI refers to the minimum time unit for scheduling in radio communication, for example. For example, in LTE systems, a radio base station schedules the radio resources (such as the frequency bandwidth and transmission power each user terminal can use) to allocate to each user terminal in TTI units. Note that the definition of TTIs is not limited to this.

The TTI may be the transmission time unit of channel-encoded data packets (transport blocks), code blocks and/or codewords, or may be the unit of processing in scheduling, link adaptation and so on. Note that, when a TTI is given, the period of time (for example, the number of symbols) in which transport blocks, code blocks and/or codewords are actually mapped may be shorter than the TTI.

Note that, when one slot or one minislot is referred to as a "TTI," one or more TTIs (that is, one or more slots or one or more minislots) may be the minimum time unit of scheduling. Also, the number of slots (the number of minislots) to constitute this minimum time unit for scheduling may be controlled.

A TTI having a time length of 1 ms may be referred to as a "normal TTI" (TTI in LTE Rel. 8 to 12), a "long TTI," a "normal subframe," a "long subframe," and so on. A TTI that is shorter than a normal TTI may be referred to as a "shortened TTI," a "short TTI," a "partial TTI" (or a "fractional TTI"), a "shortened subframe," a "short subframe," a "minislot," a "sub-slot," and so on.

Note that a long TTI (for example, a normal TTI, a subframe, etc.) may be replaced with a TTI having a time duration exceeding 1 ms, and a short TTI (for example, a shortened TTI) may be replaced with a TTI having a TTI length less than the TTI length of a long TTI and not less than 1 ms.

A resource block (RB) is the unit of resource allocation in the time domain and the frequency domain, and may include one or a plurality of consecutive subcarriers in the frequency domain. Also, an RB may include one or more symbols in the time domain, and may be one slot, one minislot, one subframe or one TTI in length. One TTI and one subframe each may be comprised of one or more resource blocks. Note that one or more RBs may be referred to as a "physical resource block (PRB (Physical RB))," a "subcarrier group (SCG)," a "resource element group (REG)," a "PRB pair," an "RB pair," and so on.

Furthermore, a resource block may be comprised of one or more resource elements (REs). For example, one RE may be a radio resource field of one subcarrier and one symbol.

Note that the structures of radio frames, subframes, slots, minislots, symbols, and so on described above are simply examples. For example, configurations pertaining to the number of subframes included in a radio frame, the number of slots included in a subframe or a radio frame, the number of minislots included in a slot, the number of symbols and RBs included in a slot or a minislot, the number of subcarriers included in an RB, the number of symbols in a TTI, the length of symbols, the length of cyclic prefix (CP), and so on can be variously changed.

Also, the information and parameters described in this specification may be represented in absolute values or in relative values with respect to given values, or may be represented using other applicable information. For example, a radio resource may be indicated by a given index.

The names used for parameters and so on in this specification are in no respect limiting. For example, since various channels (PUCCH (Physical Uplink Control CHannel), PDCCH (Physical Downlink Control CHannel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals, and so on may be input and/or output via a plurality of network nodes.

The information, signals, and so on that are input and/or output may be stored in a specific location (for example, in a memory), or may be managed in a control table. The information, signals, and so on to be input and/or output can be overwritten, updated, or appended. The information, signals, and so on that are output may be deleted. The information, signals, and so on that are input may be transmitted to other pieces of apparatus.

Reporting of information is by no means limited to the examples/embodiments described in this specification, and other methods may be used as well. For example, reporting of information may be implemented by using physical layer signaling (for example, downlink control information (DCI), uplink control information (UCI)), higher layer signaling (for example, RRC (Radio Resource Control) signaling, broadcast information (the master information block (MIB), system information blocks (SIBs) and so on), MAC (Medium Access Control) signaling, etc.), and other signals and/or combinations of these.

Note that physical layer signaling may be referred to as "L1/L2 (Layer 1/Layer 2) control information (L1/L2 control signals)," "L1 control information (L1 control signal)," and so on. Also, RRC signaling may be referred to as "RRC messages," and can be, for example, an "RRC connection setup message," "RRC connection reconfiguration message," and so on. Also, MAC signaling may be reported using, for example, MAC control elements (MAC CEs (Control Elements)).

Also, reporting of given information (for example, reporting of information to the effect that "X holds") does not necessarily have to be sent explicitly, and can be sent in an implicit way (for example, by not reporting this piece of information, or by reporting another piece of information).

Decisions may be made in values represented by one bit (0 or 1), may be made in Boolean values that represent true or false, or may be made by comparing numerical values (for example, comparison against a given value).

Software, whether referred to as "software," "firmware," "middleware," "microcode," or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions, and so on.

Also, software, instructions, information and so on may be transmitted and received via communication media. For example, when software is transmitted from a website, a server or other remote sources by using wired technologies (coaxial cables, optical fiber cables, twisted-pair cables, digital subscriber lines (DSL) and so on), and/or wireless technologies (infrared radiation, microwaves, and so on), these wired technologies and/or wireless technologies are also included in the definition of communication media.

The terms "system" and "network" as used herein are used interchangeably.

As used herein, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

As used herein, the terms "mobile station (MS)," "user terminal," "user equipment (UE)," and "terminal" may be used interchangeably.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, the examples/embodiments of the present disclosure may be applied to a configuration in which communication between a radio base station and a user terminal is replaced with communication among a plurality of user terminals (D2D (Device-to-Device)). In this case, user terminals 20 may have the functions of the radio base stations 10 described above. In addition, terms such as "uplink" and "downlink" may be interpreted as "side." For example, an "uplink channel" may be interpreted as a "side channel."

Likewise, the user terminals in this specification may be interpreted as radio base stations. In this case, the radio base stations 10 may have the functions of the user terminals 20 described above.

Certain actions which have been described in this specification to be performed by base stations may, in some cases, be performed by their upper nodes. In a network comprised of one or more network nodes with base stations, it is clear that various operations that are performed to communicate with terminals can be performed by base stations, one or more network nodes (for example, MMEs (Mobility Management Entities), S-GWs (Serving-Gateways) and so on may be possible, but these are not limiting) other than base stations, or combinations of these.

The examples/embodiments illustrated in this specification may be used individually or in combinations, which may be switched depending on the mode of implementation. The order of processes, sequences, flowcharts, and so on that have been used to describe the examples/embodiments herein may be re-ordered as long as inconsistencies do not arise. For example, although various methods have been illustrated in this specification with various components of steps in exemplary orders, the specific orders that are illustrated herein are by no means limiting.

The examples/embodiments illustrated in this specification may be applied to systems that use LTE (Long-term evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), other adequate radio communication methods, and/or next-generation systems that are enhanced based on these.

The phrase "based on" as used in this specification does not mean "based only on" unless otherwise specified. In other words, the phrase "based on" means both "based only on" and "based at least on."

Reference to elements with designations such as "first," "second," and so on as used herein does not generally limit the number/quantity or order of these elements. These designations are used herein only for convenience, as a method for distinguishing between two or more elements. It follows that reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database, or some other data structure), ascertaining, and so on. Furthermore, to "judge" and "determine" as used in the present disclosure may be interpreted as meaning making judgements and determinations related to receiving (for example, receiving information), transmitting (for example, transmitting information), inputting, outputting, accessing (for example, accessing data in a memory) and so on. In addition, to "judge" and "determine" as used in the present disclosure may be interpreted as meaning making judgements and determinations related to resolving, selecting, choosing, establishing, comparing, and so on. In other words, to "judge" and "determine" as used in the present disclosure may be interpreted as meaning making judgements and determinations with regard to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical, or a combination of these. For example, "connection" may be interpreted as "access."

As used herein, when two elements are connected, these elements may be considered "connected" or "coupled" to each other by using one or more electrical wires, cables, and/or printed electrical connections, and, as a number of non-limiting and non-inclusive examples, by using electromagnetic energy having wavelengths of the radio frequency region, the microwave region and/or the optical region (both visible and invisible).

In the present specification, the phrase "A and B are different" may mean "A and B are different from each other." The terms such as "leave," "coupled" and the like may be interpreted likewise.

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The invention claimed is:

1. A terminal comprising:
a receiver that, when receiving a first higher layer parameter indicating one or more physical uplink control channel (PUCCH) resources and a second higher layer parameter including a plurality of PUCCH spatial relation information elements, receives a medium access control-control element (MAC CE) indicating a PUCCH spatial relation information element of the plurality of PUCCH spatial relation information elements, the PUCCH spatial relation information element corresponding to a PUCCH resource that is determined by downlink control information, of the one or more PUCCH resources, and receives the downlink control information; and
a processor that uses a PUCCH resource determined by the downlink control information and the PUCCH spatial relation information element indicated by the MAC CE for a PUCCH transmission,
wherein the MAC CE indicating the PUCCH spatial relation information element is identified by a logical channel identifier (LCID) in a MAC subheader corresponding to the MAC CE and has a fixed size,
wherein the MAC CE including a header field less than 8 bits indicates a PUCCH resource ID of the PUCCH resource that is determined by the downlink control information,
wherein the MAC subheader comprises one LCID field per MAC subheader and a reserved bit set to "0," and a size of the LCID field is 6 bits,
wherein, in response to the MAC CE including a header field for indicating for a plurality of PUCCH resources, the MAC CE indicates one single PUCCH spatial relation information element of the plurality of PUCCH spatial relation information elements, and
wherein the one single PUCCH spatial relation information element indicated by the MAC CE is applied to the plurality of PUCCH resources.

2. The terminal according to claim 1, wherein each of the plurality of PUCCH spatial relation information elements includes one of a synchronization signal block (SSB) index, non-zero power (NZP)-channel state information (CSI)-reference signal (RS) resource ID, and sounding reference signal (SRS) resource ID.

3. A radio communication method for a terminal comprising:
when receiving a first higher layer parameter indicating one or more physical uplink control channel (PUCCH) resources and a second higher layer parameter including a plurality of PUCCH spatial relation information elements, receiving a medium access control-control element (MAC CE) indicating a PUCCH spatial relation information element of the plurality of PUCCH spatial relation information elements, the PUCCH spatial relation information element corresponding to a PUCCH resource that is determined by downlink control information, of the one or more PUCCH resources, and receiving the downlink control information; and
using a PUCCH resource determined by the downlink control information and the PUCCH spatial relation information element indicated by the MAC CE for a PUCCH transmission,
wherein the MAC CE indicating the PUCCH spatial relation information element is identified by a logical channel identifier (LCID) in a MAC subheader corresponding to the MAC CE and has a fixed size,
wherein the MAC CE including a header field less than 8 bits indicates a PUCCH resource ID of the PUCCH resource that is determined by the downlink control information,
wherein the MAC subheader comprises one LCID field per MAC subheader and a reserved bit set to "0," and a size of the LCID field is 6 bits,
wherein, in response to the MAC CE including a header field for indicating for a plurality of PUCCH resources, the MAC CE indicates one single PUCCH spatial relation information element of the plurality of PUCCH spatial relation information elements, and
wherein the one single PUCCH spatial relation information element indicated by the MAC CE is applied to the plurality of PUCCH resources.

4. A base station comprising:
a transmitter that, when transmitting a first higher layer parameter indicating one or more physical uplink control channel (PUCCH) resources and a second higher layer parameter including a plurality of PUCCH spatial relation information elements, transmits a medium access control-control element (MAC CE) indicating a PUCCH spatial relation information element of the plurality of PUCCH spatial relation information elements, the PUCCH spatial relation information element corresponding to a PUCCH resource that is determined by downlink control information, of the one or more PUCCH resources, and transmits the downlink control information; and
a processor that controls reception of PUCCH transmitted using a PUCCH resource determined by the downlink control information and the PUCCH spatial relation information element indicated by the MAC CE,
wherein the MAC CE indicating the PUCCH spatial relation information element is identified by a logical channel identifier (LCID) in a MAC subheader corresponding to the MAC CE and has a fixed size,
wherein the MAC CE including a header field less than 8 bits indicates a PUCCH resource ID of the PUCCH resource that is determined by the downlink control information,
wherein the MAC subheader comprises one LCID field per MAC subheader and a reserved bit set to "0," and a size of the LCID field is 6 bits,
wherein, in response to the MAC CE including a header field for indicating for a plurality of PUCCH resources, the MAC CE indicates one single PUCCH spatial relation information element of the plurality of PUCCH spatial relation information elements, and
wherein the one single PUCCH spatial relation information element indicated by the MAC CE is applied to the plurality of PUCCH resources.

5. A system comprising a terminal and a base station, wherein:
the terminal comprises:
a receiver that, when receiving a first higher layer parameter indicating one or more physical uplink control channel (PUCCH) resources and a second higher layer parameter including a plurality of PUCCH spatial relation information elements, receives a medium access control-control element (MAC CE) indicating a PUCCH spatial relation information element of the plurality of PUCCH spatial relation information elements, the PUCCH spatial relation information element corresponding to a PUCCH resource that is determined by downlink control information, of the one or more PUCCH resources, and receives the downlink control information; and a first processor that uses a PUCCH resource determined by the downlink control information and the PUCCH spatial relation information element indicated by the MAC CE for a PUCCH transmission; and the base station comprises:

a transmitter that, when transmitting the first higher layer parameter and the second higher layer parameter, transmits the MAC CE and transmits the downlink control information; and a second processor that controls reception of the PUCCH transmitted using the PUCCH resource determined by the downlink control information and the PUCCH spatial relation information element indicated by the MAC CE, wherein the MAC CE indicating the PUCCH spatial relation information element is identified by a logical channel identifier (LCID) in a MAC subheader corresponding to the MAC CE and has a fixed size, wherein the MAC CE including a header field less than 8 bits indicates a PUCCH resource ID of the PUCCH resource that is determined by the downlink control information, wherein the MAC subheader comprises one LCID field per MAC subheader and a reserved bit set to "0," and a size of the LCID field is 6 bits, wherein, in response to the MAC CE including a header field for indicating for a plurality of PUCCH resources, the MAC CE indicates one single PUCCH spatial relation information element of the plurality of PUCCH spatial relation information elements, and wherein the one single PUCCH spatial relation information element indicated by the MAC CE is applied to the plurality of PUCCH resources.

* * * * *